United States Patent Office 3,702,222
Patented Nov. 7, 1972

3,702,222
ROTOR BLADE STRUCTURE
Benjamin C. Bernales, Cincinnati, Ohio, assignor to Westinghouse Electric Corporation, Pittsburgh, Pa.
Filed Jan. 13, 1971, Ser. No. 106,040
Int. Cl. F01d 5/30
U.S. Cl. 416—212                                   6 Claims

ABSTRACT OF THE DISCLOSURE

A bladed rotor structure for an elastic fluid axial flow turbine comprising an annular row of primary grooves, and a plurality of primary rotor blades of the side-entry type disposed in the grooves. Each blade has a root, the radially inner portion of the root being disposed in its corresponding groove in the rotor and the radially outer portion of each root being disposed outside of the rotor. The radially outer portion of each root has serrated edges which, together with the adjacent roots of the primary blades, jointly define an annular array of axially extending secondary grooves. Secondary rotor blades having roots corresponding in shape to the secondary grooves are inserted into the grooves, the primary and secondary blades jointly defining a transverse annular row of rotating blades.

BACKGROUND OF THE INVENTION

This invention relates generally to elastic fluid axial flow turbines and compressors and more particularly, to a bladed rotor structure utilized in such machines.

It is well known that in the upstream or high pressure end of a multi-stage turbine rotor, greater numbers of smaller blades are used in comparison to the fewer numbers of larger blades used at the downstream or low pressure end of the rotor. This is necessary to provide a more efficient extraction of power from the hot motive fluid so as to maximize the amount of energy removed from the fluid.

However, it is a very expensive and time consuming operation to accurately machine each row of grooves in the rotor, with different numbers of grooves in each row, some of the rows having grooves of various shapes and sizes.

Some cost reducing methods are suggested and more fully described in copending applications Ser. No. 111,531 by A. H. Redding, filed Feb. 1, 1971, and Ser. No. 111,530 by R. J. Ortolano, filed Feb. 1, 1971, both of which are assigned to the present assignee. In these methods, a "straight through" broaching technique is utilized to machine a rotor structure where the rows have the same number of grooves, which grooves are similar in shape throughout the numerous rows in the rotor structure. The problem still remains, however, to utilize this type of cost reducing method and still economically manufacture a rotor structure to have the flexibility of design to increase the number of blades in the high pressure end of the rotor structure.

SUMMARY OF THE INVENTION

In accordance with this invention, a turbine or compressor rotor is provided with a plurality of axially extending primary grooves in an annular row, into which a corresponding plurality of primary rotor blades are disposed. Each rotor blade is comprised of a blade portion and a root portion. The root portion has a radially inner portion, interlockingly disposed within a corresponding groove in the rotor, and has a radially outer portion having serrated ridges on mutually opposite sides. The radially outer portion of the root projects beyond the periphery of the rotor. The adjacent outer root portions, outside of the rotor, jointly define an annular array of axially extending secondary grooves, alternately spaced between the primary grooves. A plurality of secondary blades having roots corresponding in shape to the secondary grooves, are disposed in the grooves. The primary and secondary blades are alternately spaced and aligned in a circumferential direction to jointly define an annular row of blades.

Thus, flexibility of design is obtained so that a straight through broaching technique can be employed and furthermore, the number of blades in the upstream portion of the rotor can be doubled.

DESCRIPTION OF THE PREFERRED EMBODIMENTS

This invention relates generally to an elastic fluid axial flow turbine or compressor and more particularly to a rotor structure utilized in such machines.

Figure 1:
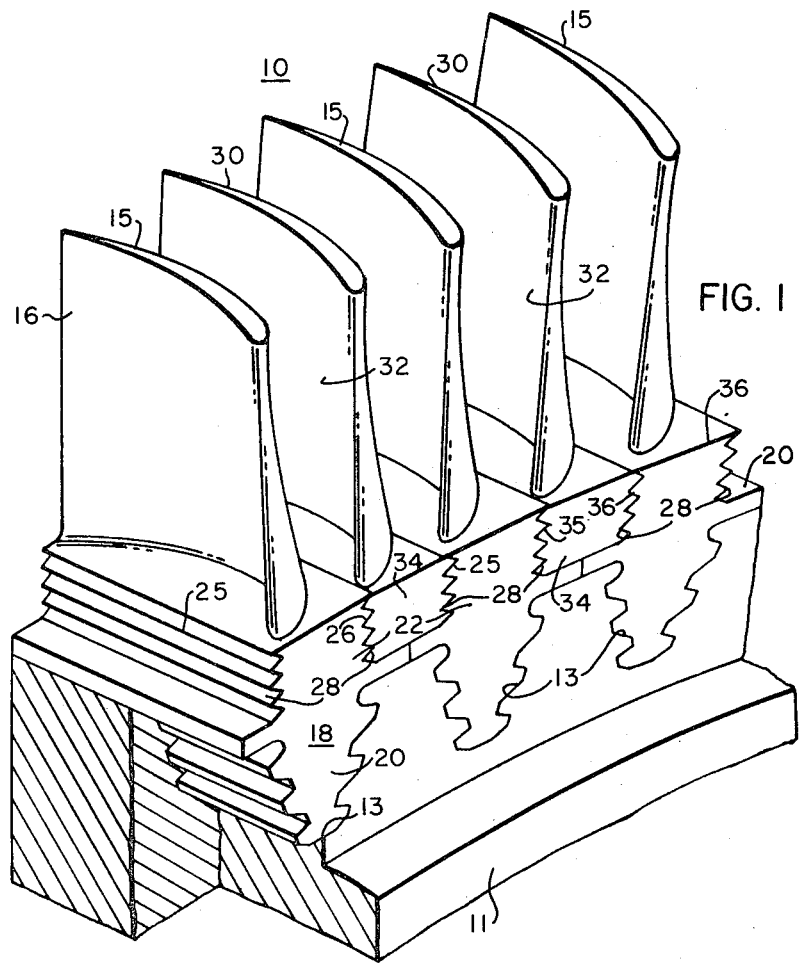
FIG. 1 is a view in perspective of a portion of a bladed rotor structure built in accordance with the present invention.
Figure 2:
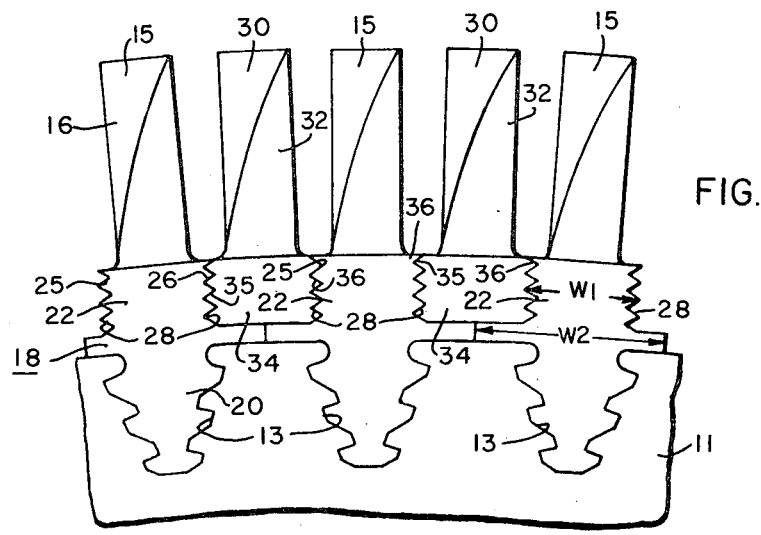
FIG. 2 is a side elevational view of a portion of the bladed rotor structure.

Referring to FIG. 1, there is shown a fragmentary view of a rotor structure 10, only a part of which has been shown, it being understood that the structure is part of an elastic fluid axial flow turbine or compressor (not shown). The rotor structure 10 includes a portion of a rotor 11. As shown in FIGS. 1 and 2, the rotor 11 has an annular row of primary grooves 13 which extend radially from the axis of rotation of the rotor structure. The primary grooves 13, as shown, extend axially or parallel to the axis of rotation of the rotor 11. The grooves 13 are in an annular array and are equally spaced from each other in the circumferential direction and from the axis of rotation in the radial direction. The grooves 13 are similar in shape and size to each other and have a fir tree root cross-section. The grooves 13 accept blades 15 of the side entry type, i.e., the blades 15 are inserted sideways into locking relation with the grooves in an axial direction relative to the rotor. It is pointed out that the primary grooves 13 can be of any other well known shape or type.

Each blade 15 has a vane portion 16 of the usual air foil contour, as well known in the art, and an integral root portion 18, which attaches the blade 15 to the rotor 11.

The root portion 18 has a radially inner portion 20, which has a fir tree root cross-section. The radially outer portion or the base 22 of the root portion 18 is integral with the radially inner portion 20. As shown, the base 22 has a smaller width W1 than the lateral extensions which form the widest portion of the fir tree root cross-section W2. On opposite sides of the base 22 are serrated keying portions 25 and 26. The adjacent radially outer root or base portions 22 and the radially outer surfaces of the lateral extensions of the fir tree root W2, cooperatively define a secondary row of axially extending grooves 28. The grooves 28 are equally spaced from each other in the circumferential direction and from the axis of rotation in the radial direction.

A plurality of secondary blades 30 of the side entry type is provided equal in number to the primary blades 15. Each secondary blade has a vane portion 32 and an integral root or keying portion 34. The root portion 34 has serrated edges 35 and 36 on opposite sides of the root 34. The edges 35 and 36 cooperate with the keying portions 25 and 26 on the adjacent primary blades 15 to key the secondary blades 30 to the root portion 18 of the primary blades 15. Therefore the secondary blades 30 are carried by the primary blades 15 and the forces associated therewith are transmitted directly to the primary blades and indirectly to the rotor structure.

As shown, the secondary blades 30 are also of the side entry type since the blades are inserted into the secondary grooves 28 in an axial direction.

The primary and secondary blade rows are annularly or circumferentially aligned with each other and jointly define an annular row of blades alternately composed of equally spaced primary blades 15 and secondary blades 30. Both primary and secondary blades 15 and 30 respectively, have their blade tips at the same radial distance from the axis of rotation. The vane portions 16 and 32 of the blades 15 and 30 respectively, are of uniform cross-section and cooperatively define similar motive fluid passages.

It is further noted that the roots 34 of the secondary blades 30 and the bases 22 of the primary blades 15 have their outer portions at the same radial distance from the axis of rotation of the rotor 11. These base portions 22 and root portions 34 jointly define an annular platform 36 for the annular row of blades of the rotor structure 10. The platform 36 prevents the hot motive gases from leaking past the blades 15 and 30 at their respective root portions 18 and 34 and directs the flow to the vane portions of the blades to maximize the working forces of the motive gases.

It can be seen then, that a bladed rotor structure has been designed that enables a doubling of the number of rotor blades which can be used in a particular blade row, so that a more efficient extraction of power can be obtained from the hot motive fluid. Furthermore, a substantial cost reduction can be maintained by using a straight through broaching technique to standardize the numbers of grooves and their shapes which are machined in the rotor structure.

Since numerous changes may be made in the above described embodiments, and different embodiments of the invention may be made without departing from the spirit and scope thereof, it is intended that all the matter contained in the foregoing description or shown in the accompanying drawings shall be interpreted as illustrative and not in a limiting sense.

What is claimed is:

1. In a turbine rotor member having a plurality of axial grooves disposed in a transverse row about the rotor, a first plurality of blades each having a root portion and a single vane portion extending radially from the root portion, the root portion having a radially inner portion engaging in one of said grooves and a radially outer portion extending outside the groove, said outer root portion being immediately adjacent the inner portion and being disposed between the inner portion and the vane portion, the inner root portion and the groove having interengaging surfaces to retain the blade in the groove, and a second plurality of blades equal in number to said first plurality, the blades of said second plurality each having a root portion and a vane portion substantially identical to the vane portions of the first plurality of blades, the root portion of each of the second plurality of blades being disposed in the space between the outer root portions of two adjacent blades of the first plurality, and said outer root portions and the root portions of the second plurality of blades having cooperating means for retaining the blades in place, the blades of said first and second pluralities alternating around the rotor to form a single annular row of blades.

2. The combination defined in claim 1 in which the outer root portions of the first plurality of blades and the root portions of the second plurality of blades have serrated surfaces in interengaging relation to retain the second plurality of blades in place.

3. The combination defined in claim 1 in which the root portions have lateral extensions between the inner and outer root portions, and the lateral extensions of adjacent blades of said first plurality of blades abut each other and cooperate with the outer root portions of said blades to form grooves for the root portions of the second plurality of blades.

4. The combination defined in claim 3 in which the outer root portions of the blades of the first plurality and the root portions of the blades of the second plurality are formed with interengaging surfaces to retain the blades of the second plurality in place.

5. The combination defined in claim 1 in which the outer root portions of the blades of the first plurality and the root portions of the blades of the second plurality have radially outward surfaces which cooperate to form a substantially continuous cylindrical platform extending around the rotor.

6. The combination defined in claim 5 in which said root portions of both pluralities of blades have interengaging abutting surfaces radially inward of said platform.

References Cited
UNITED STATES PATENTS

| | | | |
|---|---|---|---|
| 1,585,713 | 5/1926 | Herr et al. | 416—220 |
| 2,781,998 | 2/1957 | Barr | 416—220 |
| 2,873,947 | 2/1959 | Perry | 416—220 |
| 3,002,675 | 10/1961 | Howell et al. | 416—193 X |

FOREIGN PATENTS

| | | | |
|---|---|---|---|
| 129,828 | 11/1948 | Australia | 416—219 |
| 536,363 | 11/1931 | Germany | 416—212 |
| 189,131 | 3/1923 | Great Britain | 416—193 |
| 126,501 | 6/1959 | U.S.S.R. | 416—220 |

EVERETTE A. POWELL, Jr., Primary Examiner

U.S. Cl. X.R.

416—219